United States Patent [19]

Batt et al.

[11] 4,321,094

[45] Mar. 23, 1982

[54] NEWS INK

[75] Inventors: Colin B. Batt, Acton; David Daffern, Agincourt; Paramanda Gupta, Rexdale, all of Canada

[73] Assignee: Canada Printing Ink, Islington, Canada

[21] Appl. No.: 194,436

[22] Filed: Oct. 6, 1980

[30] Foreign Application Priority Data

May 15, 1980 [CA] Canada ................................... 352055

[51] Int. Cl.³ ............................................. C09D 11/02
[52] U.S. Cl. ........................................ 106/32; 106/285
[58] Field of Search .................... 106/32, 285; 208/18, 208/268

[56] References Cited

U.S. PATENT DOCUMENTS 3,847,623 11/1974 Mills et al. ............................ 106/32

FOREIGN PATENT DOCUMENTS 582265 11/1977 U.S.S.R. ................................. 106/27

Primary Examiner—Allan Lieberman
Attorney, Agent, or Firm—Larson and Taylor

[57] ABSTRACT

A news ink of low misting properties comprising a dispersion of a news ink pigment in a hydrocarbon oil, wherein the oil has the following physical properties:
Color: water white
Aromatic content: zero
Refractive index: 1.467–1.480
Specific gravity: 0.850–0.879
Viscosity, cSt/40° C.: 9.38–439.7
Aniline point, °C.: 96–138.

9 Claims, No Drawings

NEWS INK

BACKGROUND OF THE INVENTION (a) Field of the Invention

This invention relates to news inks and the like and, more particularly to news inks with controlled rheological characteristics. These inks are thus better suited to printing needs, especially in high speed presses, as they contain no potentially toxic hydrocarbons, and also give rise to a far lower degree of misting in use, without becoming too short.

(b) Description of the Prior Art

News inks are prepared generally by mechanically dispersing a pigment into a mineral ink oil. For many years the only pigment used in quantity was carbon black, but with the advent of colour print in newspapers, other colours are now used in larger quantities. However, black ink, based generally on some form of carbon black, still represents by far the largest proportion of the ink used. The oil used in preparing these inks serves as the single vehicle for the ink. Surprisingly, little detailed attention appears to have been paid, in the past, to mineral oil systems useful for ink oils, even though this usage represents a tonnage-scale level of consumption. For example, U.S. Pat. No. 3,615,754 (issued Oct. 26, 1971 to W. W. Gotshall) whilst being concerned with non-bleeding ink compositions, laconically remarks that "Any liquid varnish that is commonly used with ink formulations may be used here, such as . . . mineral oils . . . ". Similarly U.S. Pat. No. 3,199,991 (issued Aug. 10, 1965 to The California Ink Company) is reticent concerning ink oils.

In general, existing inks based on hydrocarbon oils suffer from at least one of a number of shortcomings. These are:

(a) misting;
(b) poor colour brightness;
(c) poor transfer quality; and
(d) toxicity.

As these four are relatively important to this invention, some comment upon each is desirable.

Misting occurs when the ink applied to a roller for printing purposes fails to stay on that roller while it is rotating. In modern printing presses using paper speeds of 1,000 ft/min to 2,000 ft/min, these inked rollers rotate with a high surface speed: in its turn, this places a high centrifugal force on the ink. Due to this force a proportion of the ink literally flies off, causing formation of an ink mist. Apart from being a waste of ink, and cause of cleaning problems, this mist also presents a significant environmental and health problem.

Poor colour brightness arises when oils which may have been found acceptable for black inks are used for colours, especially light colours such as pinks and yellows. The problem is that many ink oils are far from water-white; ink oil specifications often contain a colour limitation, for example the figure of 2.5, according to ASTM D-1500, to be found in the claims of U.S. Pat. No. 3,847,623 (issued Nov. 12, 1974 to Sun Oil Co.).

Poor transfer quality, which is associated with poor strike through, poor set off, and shortness, is connected, at least in part, with oil viscosity. Too high a viscosity causes shortness and lack of strike-through, where as too low viscosity will cause the reverse. It can also be seen from this that at least shortness and misting are, to a degree, interrelated, for lengthening an oil, for example by adding a solvent, will decrease its viscosity and hence tend to increase its propensities for misting.

Toxicity arises in two ways. Where misting is going on, it is harmful to the operator's lungs to be exposed to such an atmosphere containing minute oil drops. The second possibility is that these oil drops may contain within them substances injurious to health. While the use of lead and selenium-based pigments for colours has effectively ceased, many printing ink oils still contain proportions of aromatic hydrocarbons which either are proven to be potentially carcinogenic, such as benzene, or are believed to be potentially carcinogenic, such as toluene and polycyclic compounds. Clearly elimination of these from an ink is desirable for health reasons. Such an elimination would also have an indirect benefit. The printing presses commonly in use generally use rollers which have rubber surfaces, which are prone to swelling and softening by aromatic hydrocarbons. Elimination of aromatic-hydrocarbons from the oil will thus improve press roller life.

SUMMARY OF THE INVENTION

As a consequence, no doubt, of the increasing price of crude oil, many of the so-called mineral oils now available are not simple straight run oil refinery products, obtained by separating crude oil into a number of parts. These oils are obtained by subjecting various hydrocarbon materials to a variety of chemical treatments whereby although a substance having properties similar to those of the older oils results, its chemical constitution may be quite different. As a consequence, some of these oils have quite different properties to the oils used hitherto. In particular it is now possible to obtain oils which are water-white, contain no mono- or polycyclic aromatics, and have a desirable viscosity range.

It has now been found that such an oil can be used to provide a news ink with markedly improved properties, especially misting, when compared to known oils used in such inks. This discovery is all the more surprising because it has also been found that these new oils are apparently useless in ordinary letterpress ink oils, varnishes and resins. The problem appears to be incompatibility on cooling the ink when replacing conventional ink oils, such as Circosol 4130 or 5600, and Sunthene Oil 5600.

DESCRIPTION OF THE PREFERRED EMBODIMENTS

Thus a first embodiment this invention provides a news ink of low misting properties comprising a dispersion of a news ink pigment in a hydrocarbon oil, wherein the oil has the following physical properties:
Colour: water-white
Aromatic content: zero
Refractive index: 1.467–1.480
Specific gravity: 0.850–0.879
Viscosity, cSt/40° C.: 9.38–439.7
Aniline point, °C.: 96–138

A group of oils which admirably meets these requirements are the so-called hydrotreated oils, marketed by Gulf Oil under the trade mark PARAFLEX HT. Any of the oils from the series HT10 to HT460 can be used; the preferred ones being HT220, 320 and 460. Of these, the best appears to be HT320 for high speed newspaper printing. This has the following properties:
Colour: water-white
Aromatic Content: zero
Refractive index: 1.4800

Specific gravity: 0.878
Viscosity, cSt/40° C.: 317.8
Aniline point, °C.: 134

These new inks can be prepared in the usual way by dispersing the pigment into the oil. For black inks this procedure is fully adequate. For coloured inks, it has been found preferable to disperse the pigment into a portion of the oil, and then use this coloured base to make the ink, by adding more oil to it. Modifiers commonly used in ink formulations, such as pigment wetting agents (e.g. fatty amines or esterified fatty acids), natural and synthetic waxes, and extenders (e.g. clays and calcium carbonate) and other standard ink additives can be incorporated when preparing the above inks.

Hence in a second embodiment this invention provides a process for preparing a news ink of low misting properties which comprises dispersing a coloured pigment in a hydrocarbon oil wherein the oil has the following physical properties:
Colour: water-white
Aromatic content: zero
Refractive index: 1.467–1.480
Specific gravity: 0.850–0.879
Viscosity, cSt/40° C.: 9.38–439.7
Aniline point, °C.: 96–138

Preferably the dispersing is carried out in two steps, by first preparing a concentrated colour base, and then mixing the colour base with the remainder of the oil.

Generally speaking these inks will contain from 5% to 30% by weight of pigment; a preferred range, in practice is from 8 to 25%, although for special purposes amounts outside these ranges may be found necessary.

These new oils as sold do not have a continuous range of properties, especially viscosity. For some purposes it can therefore be found that none of the as-sold oils has the desirable properties. This difficulty can easily be overcome by blending two, or more, oils until the desired properties are obtained. Such blends appear to function as well as the as-sold oils.

Compared to the known inks, these new inks have been found to have the following advantages.

Due to the total absence of aromatic substances, based on both infrared spectroscopy and NMR traces, toxicity is markedly reduced. Due to the clear water white-colour, the quality of the printed colours is improved. Perhaps most importantly, for reasons which are not readily apparent, misting is substantially reduced in some cases being effectively eliminated. Again for reasons not readily apparent, the print quality is also improved, possibly due to better transference. Sharper dot reproduction from half-tone plates and sharper prints from photolitho plates have both been observed. Finally, in the long term, the zero aromatic content can be expected to lead to longer print roller life.

EXAMPLES

Four inks were prepared as follows, in each case by grinding the pigment in the specified amount of oil; "parts" refers to parts by weight.

| 1(a) Colour base: | Paraflex 320: | 68 parts |
|---|---|---|
|  | phthalocyanine blue: | 32 parts |
| (b) Blue Ink: | Colour base: | 25 parts |
|  | Paraflex 320: | 75 parts |
| 1(a) Colour base: | Paraflex 320: | 70 parts |
|  | Yellow 12: | 30 parts |
| (b) Yellow Ink: | Paraflex 320: | 137 parts |
|  | Colour base | 90 parts |

-continued

| 3(a) Colour base: | Paraflex 320: | 71 parts |
|---|---|---|
|  | Red Lake C: | 29 parts |
| (b) Red Ink: | Paraflex 320: | 15 parts |
|  | Colour base: | 6 parts |
| 4 Black Ink: | Paraflex 320: | 91 parts |
|  | Carbon black: | 9 parts |

These inks were then compared with standard inks made up using the same pigments and Circosol 4130 or 5600 as standards. Three tests were applied:

(a) Transfer: using a "Little Joe" press and a Vandercook press (Letterpress, two colour): brightness and smudge resistance were evaluated.

(b) Rub: using Sutherland rub tester, 50 strokes, 2 lb. weight.

(c) Tack & Misting: Prufbau tack machine.

Test Results: "Better" means better than standard, etc.

| Ink | Transfer | Rub | Tack | Misting |
|---|---|---|---|---|
| Blue | Better | Comparable | Comparable | Less |
| Yellow | " | " | " | Less |
| Red | Better* | " | " | Very little |
| Black | Better | " | " | Less |

*also less strike-through

Confirmatory tests were then made with similar inks on two commercial size presses for newspaper printing.

(a) a Goss Headliner MK I press, operating at 1700 ft/min. The rub, transfer and printability were good, with cleaner colours and less strike through. Very little misting was observed.

(b) a Crabtree Viceroy press, operating at 1250 ft/min. The same results as with the Goss press were observed, especially the very low level of misting.

What we claim as our invention is:

1. A news ink of low misting properties comprising a dispersion of a news ink pigment in a hydrocarbon oil, wherein the oil has the following physical properties:
Colour: water-white
Aromatic content: zero
Refractive index: 1.467–1.480
Specific gravity: 0.850–0.879
Viscosity, cSt/40° C.: 9.38–439.7
Aniline point, °C.: 96–138.

2. An ink according to claim 1 containing 5% to 30% by weight pigment.

3. An ink according to claim 2 containing 8% to 25% by weight pigment.

4. An ink according to claim 1 wherein the oil has the following properties:
Colour: water-white
Aromatic content: zero
Refractive index: 1.4800
Specific gravity: 0.878
Viscosity, cSt/40° C.: 317.8
Aniline point, °C.: 134.

5. A process for preparing a news ink of low misting properties which comprises dispersing a coloured pigment in a hydrocarbon oil wherein the oil has the following physical properties:
Colour: water-white
Aromatic content: zero
Refractive index: 1.467–1.480
Specific gravity: 0.850–0.879
Viscosity, cSt/40° C.: 9.38–439.7
Aniline point, °C.: 96–138.

6. A process according to claim 5, wherein the dispersion is carried out in two steps, by first preparing a concentrated colour base and then mixing the colour base with the remainder of the oil.

7. A process according to claims 5 or 6 wherein from 5% to 30% of pigment is used.

8. A process according to claims 5 or 6 wherein from 8% to 25% of pigment is used.

9. A process according to claims 5 or 6 wherein the oil has the following properties:
Colour: water-white
Aromatic content: zero
Refractive index: 1.4800
Specific gravity: 0.878
Viscosity, cSt/40° C.: 317.8
Aniline point, °C.: 134.

* * * * *